Feb. 24, 1959     H. VAN DER KOLK     2,874,799

CYCLONES

Filed Nov. 7, 1955

Inventor
Hendrik van der Kolk
by Stevens, Davis, Miller & Mosher
his attorneys

United States Patent Office 2,874,799
Patented Feb. 24, 1959

2,874,799
CYCLONES

Hendrik van der Kolk, Heemstede, Netherlands, assignor to Bureau van Tongeren N. V., Heemstede, Netherlands, a Dutch company Application November 7, 1955, Serial No. 545,502

Claims priority, application Netherlands November 11, 1954

1 Claim. (Cl. 183—34)

A cyclone for separating dust or small liquid particles from gas normally comprises a substantially cylindrical and/or conical shell having a tangential inlet opening for the dust laden gas and two outlet openings, one for the purified gas, the other for the dust.

If the solid particles are very small, for instance of the order of one micron, the separation thereof requires very considerable centrifugal forces to overcome the relatively great resistance offered by said particles against their displacement in the gas. Thus, it is obvious that, in such instance, a cyclone having a very small diameter could be used. For example, if the diameter of the separation chamber of the cyclone is 10 millimetres and the circumferential speed of the gas across the inner wall of said space is 10 metres/sec., the value of the centrifugal force acting upon a particle whirling across said wall will be approximately 2000 times that of the force of gravity. However, these small sized cyclones are liable to rapid obstruction by the solid particles. A remedy would be adding a certain amount of water, or another liquid, if necessary mixed with a moistening agent, to the dust laden gas, with a view to removing the dust together with the liquid by way of the dust outlet opening of the cyclone. However, since it is impossible for the dust to be removed completely from the dust laden air supplied to a cyclone, a certain amount of dust and liquid will accompany the gas flowing through the gas outlet opening, whereby the latter may become obstructed after a relatively short time.

My present invention, which has for its object to remove such inconvenience, comprehends that gas, containing liquid particles suspended therein, is supplied to a cyclone, preferably a very small cyclone, which is provided with only one outlet opening for both the gas and the liquid. It will be understood that the liquid particles suspended in the gas supplied to the cyclone and thrown outwards against the wall of the separating chamber will unite, together with dust, present in the gas, to form relatively big drops, which are discharged, together with the gas, through the single outlet opening. It is well known in the art that it does not offer any serious difficulty to free the mixture from the drops.

Should dust laden gas to be purified not contain a sufficient amount of finely divided liquid, it will, as a matter of course, be necessary to mix said gas with such liquid before the same enters the cyclone.

Figure 2:
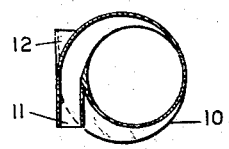
Figure 2 is a plan view of the cyclone of Figure 1.
Figure 1:
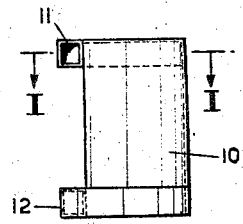
Figure 1 is a side elevational, partly schematic, view of one form of cyclone used to carry out the process of this invention.

Figs. 1 and 2 show a cyclone comprising, a cylindrical separation chamber 10 closed both at top and bottom, with a tangential inlet passage 11 near the top and a tangential outlet passage 12 near the bottom, said passages extending a substantial angular distance inside the separation chamber. If gas having solid and liquid particles suspended therein is supplied to the inlet passage 11, then, as stated above, the relatively big drops, which have each been formed by agglomeration of a number of minor liquid particles initially suspended in the gas, and which also contain a certain amount of dust, will be discharged, together with the gas, by the outlet passage 12. Thereafter, the separation of said drops from the gas can be carried out in any suitable device known for this purpose.

Figure 4:
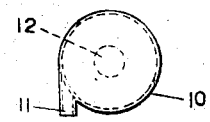
Figure 4 is a plan view of the cyclone of Figure 3.
Figure 3:
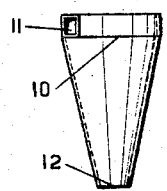
Figure 3 is a side elevational view of a modified form of cyclone.

The cyclone illustrated in Figs. 3 and 4 comprises a closed top, cylindrical separation chamber 10 merging into an open bottom funnel. The inlet passage is provided near the top wall of said chamber and the bottom opening of the funnel constitutes the single discharge opening 12.

Figure 6:
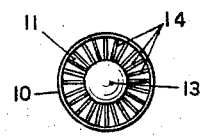
Figure 6 is a plan view of the cyclone of Figure 5.
Figure 5:
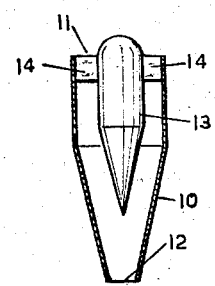
Figure 5 is a vertical sectional view of another form of cyclone.

In accordance with Figs. 5 and 6, the cyclone also comprises an open top, cylindrical separation chamber merging into an open bottom, conical funnel. Mounted with ample clearance coaxially within the said cyclone is a partly cylindrical, partly conical body 13, and secured to the upper part of said body is a series of approximately radial blades 14 extending to the wall of the separation chamber, said blades being so shaped and positioned as to impart rotary movement about the axis of said chamber to the gas supplied through the open top.

Figure 8:
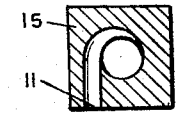
Figure 8 is a cross-sectional view taken on line 8—8 of Figure 7.
Figure 9:
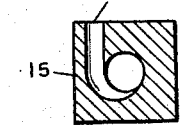
Figure 9 is a cross-sectional view taken on line 9—9 of Figure 7.
Figure 7:
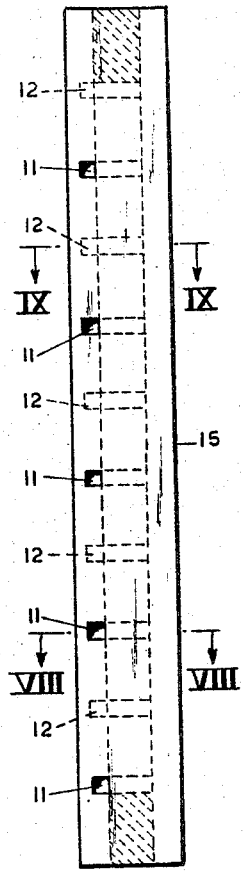
Figure 7 is a side elevational view of a plurality of cyclones in accordance with Figures 1 and 2.

Figs. 7, 8 and 9 each show how a plurality of cyclones in accordance with Figs. 1 and 2, but devoid of covers and bottoms, is constituted as a hollow in a cubic block, a plurality of these blocks being united to form an elongated unit 15 provided with supply passages 11 and discharge passages 12.

It is to be noted that in the forms of the invention shown in Figures 1, 2, 7, 8 and 9, the tangential outlet ports 12 are located at opposite sides of their chambers from their associated inlet ports 11 and are adapted to discharge the liquid-laden gas in the same direction of rotation given to the gas supplied to the chambers through the tangential inlet ports 11.

Furthermore, it is to be noted that in the form of the invention shown in Figures 7, 8 and 9, the plurality of cyclones (with the top and bottom covers of Figures 1 and 2 removed) define a plurality of end-to-end adjoining and communicating chambers having a common interior wall surface which is of substantially constant cross-sectional shape, for example, circular cross-sectional shape of constant diameter, said chamber defining an elongated cavity which is closed at its ends, as shown in Figure 7. Because of the provision of a plurality of adjoining chambers, the particles of dust and liquid admitted through the tangential inlet ports 11 are allowed to rotate through a sufficient number of revolutions to agglomerate to sufficient size and mass so that the agglomerated drops of dust and liquid will acquire sufficient velocity to eventually escape through a nearby tangential outlet port somewhere along the length of the adjoining chambers. Since the chambers have a common interior wall surface with no partitions preventing free axial movement of the agglomerated rotating particles, it will be apparent that the rotating agglomerated particles will be enabled to move through a relatively large number of revolutions, constantly increasing in size until, because of the attainment of sufficient mass, the agglomerations will acquire enough velocity to escape through nearby tangential outlet openings 12. This provides a more thorough separating action than would occur where only a single cyclone chamber is used.

A plurality of cyclones as shown in Figs. 3 and 4 can also be combined to constitute a unit by providing a relatively thick plate with correspondingly shaped hollows, for instance by moulding or cutting, and by covering said plate by a second, relatively thin plate provided with openings communicating with the inlet passages 11.

In a similar manner a plurality of cyclones in accordance with Figs. 5 and 6 can be combined to a unit, comprising a relatively thick plate having hollows each in the shape of a cyclone, in which case a separate element 13, 14 should be provided in each hollow.

Obviously, the term "only one outlet passage" for both the gas and the particles suspended therein is intended to include the provision of two or more parallel outlet passages for the said purpose, and the same remark applies to the inlet passage for the gas to be purified.

What I claim is:

A cyclone for agglomerating minute particles of liquid suspended in a gas to form relatively large drops, said cyclone comprising a unit consisting of a plurality of end to end adjoining and communicating separating chambers having a common interior wall surface which is of substantially constant cross-sectional shape, each of said chambers being provided with only one tangential inlet and only one tangential outlet axially spaced from the inlet, said tangential inlet being constructed and arranged to impart rotary movement to gas supplied thereto, said tangential outlet being constructed and arranged to discharge the liquid laden gas with the same direction of rotation imparted by the inlet, the inlet being at a side of the chamber opposite the side containing the outlet.

References Cited in the file of this patent

UNITED STATES PATENTS

| | | |
|---|---|---|
| 979,210 | Serrell | Dec. 20, 1910 |
| 2,668,620 | Fontein | Feb. 9, 1954 |
| 2,708,486 | Hedberg | May 17, 1955 |
| 2,765,867 | Revallier et al. | Oct. 9, 1956 |
| 2,795,293 | Allen | June 11, 1957 |

FOREIGN PATENTS

| | | |
|---|---|---|
| 65,194 | Norway | Aug. 24, 1942 |